United States Patent
Chauvet et al.

(10) Patent No.: US 7,783,609 B2
(45) Date of Patent: Aug. 24, 2010

(54) STORING INFORMATION IN OTHERWISE UNUSED SPACE IN VTOC AND VVDS FOR RECOVERY OF DATA

(75) Inventors: Philip R. Chauvet, Tucson, AZ (US); David C. Reed, Tucson, AZ (US); Michael R. Scott, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 12/019,628

(22) Filed: Jan. 24, 2008

(65) Prior Publication Data

US 2009/0193062 A1 Jul. 30, 2009

(51) Int. Cl.
*G06F 7/00* (2006.01)
(52) U.S. Cl. ..................................................... 707/674
(58) Field of Classification Search ................. 711/147, 711/149, 112; 713/1, 2, 300; 714/6
See application file for complete search history.

(56) References Cited

U.S. PATENT DOCUMENTS

| | | | | | |
|---|---|---|---|---|---|
| 4,408,273 | A | * | 10/1983 | Plow | 707/999.202 |
| 4,528,624 | A | * | 7/1985 | Kamionka et al. | 718/104 |
| 4,855,907 | A | * | 8/1989 | Ferro et al. | 707/999.204 |
| 5,983,317 | A | * | 11/1999 | Kanda et al. | 711/112 |
| 6,631,477 | B1 | | 10/2003 | LeCrone et al. | |
| 2005/0187990 | A1 | * | 8/2005 | Pace et al. | 707/204 |
| 2008/0109599 | A1 | * | 5/2008 | Smith | 711/112 |

* cited by examiner

*Primary Examiner*—Cheyne D Ly
(74) *Attorney, Agent, or Firm*—Dan Shifrin

(57) ABSTRACT

When a VTOC and a VVDS are established for information used to access data sets of a volume, unused space remains in both structures. The data sets, VTOC and VVDS are stored on a recordable medium. For VSAM data sets, other, vital information about the data set is also stored in the VTOC; for non-VSAM data sets, vital information about the data set is also stored in the VVDS. If the VOTC entry of a non-VSAM data set becomes corrupted, the vital information in the VVDS may be used to access the stored data set. Similarly, If the VVDS entry of a VSAM data set becomes corrupted, the vital information in the VTOC may be used to access the stored data set.

11 Claims, 3 Drawing Sheets

STORING INFORMATION IN OTHERWISE UNUSED SPACE IN VTOC AND VVDS FOR RECOVERY OF DATA

TECHNICAL FIELD

The present invention relates generally to data storage and, in particular, to dataset recovery without relying on conventional backups.

BACKGROUND ART

In a data storage system, one or more storage devices, such as hard disk drives (HDDs) or tape drives, are connected to a host, generally through a storage control unit. Datasets are transmitted by the host to be stored on the storage devices; a request to access a dataset is similarly transmitted by the host and, in response, the storage device transmits the requested dataset back to the host. It will be appreciated that the actual process is substantially more complicated; the details are well known in the art and not relevant to the present invention.

One data management system which was introduced by IBM as part of its OS/VS operating systems was the Virtual Storage Access Method (VSAM). The unit of data that is transferred in an input/output (I/O) operation is a control interval (CI). Other details of VSAM are well known and will not be described herein.

Entries related to a data set in a particular volume stored on a storage device, whether the volume is VSAM or non-VSAM, are maintained by the host operating system in a volume table of contents (VTOC) and stored with the volume. A VTOC entry includes vital information about the format and location of the data set in the volume. For a data set in a VSAM volume, an entry of additional vital information is maintained in a VSAM Volume Data Set (VVDS) and stored with the volume. To access a non-VSAM data set, the information in the VTOC entry is required. To access a VSAM data set, the information in the VVDS is required. Thus, if the VTOC entry becomes corrupted, it may be difficult, if not impossible, to access the associated non-VSAM data. Similarly, if the VVDS entry becomes corrupted, it may be difficult, if not impossible, to access the associated VSAM data.

SUMMARY OF THE INVENTION

The present invention provides a method for storing recovery information for data sets in a data volume. When data sets of a volume are stored on a recordable medium, first information about the data sets are stored in a first portion of a predetermined amount of space in the volume table of contents (VTOC) and second information about the data sets is stored in a first portion of a predetermined amount of space in the virtual storage access method (VSAM) volume data set (VVDS). A portion of the predetermined amounts of space in the VTOC and in the VVDS remains unused. In accordance with the present invention, additional specified information about the data sets is stored in unused space in a selected one of the VTOC and VVDS.

The present invention also provides a data storage system which includes an interface through which one or more storage devices are coupled, a processor operable to execute programming code and a memory in which the programming code is stored. The code comprises instructions for storing first information about data sets of a volume in a first portion of a predetermined amount of space in the VTOC when the data sets are stored on a recordable medium. The code further comprises instructions for storing second information about the data sets of the volume in a first portion of a predetermined amount of space in the VVDS when the data sets are stored on the recordable medium. A portion of the predetermined amounts of space in the VTOC and in the VVDS remain unused. The code also includes instructions for storing additional specified information about the data sets in unused space in a selected one of the VTOC and VVDS.

DETAILED DESCRIPTION OF THE PREFERRED EMBODIMENT

Various functions performed by the present invention may be implemented in hardware or may be implemented in software for execution by various types of processors. Furthermore, the described features, structures, components or characteristics of the invention may be combined in any suitable manner in one or more embodiments. In the following description, numerous specific details are provided, such as examples of program instructions, hardware and software modules, data structures, etc. to provide a thorough understanding of embodiments of the invention. One skilled in the relevant art will recognize, however, that the invention can be practiced without one or more of the specific details, or with other methods, components, materials, and so forth. It will also be appreciated that well-known components or steps may not be shown or described in detail, or even mentioned, to avoid obscuring aspects of the invention.

The flow chart diagrams that are described herein are generally set forth steps and processes in a particular order which is indicative of an embodiment of the present invention. Other steps and processes, or the order of the steps and processes, may be conceived that are equivalent in function, logic or effect to one or more steps, or portions thereof, of the illustrated process. Additionally, the format and symbols employed are provided to explain the logical flow of the process and are understood not to limit the scope of the process. Additionally, the order in which a particular process occurs may or may not strictly adhere to the order of the corresponding steps shown.

Figure 1:
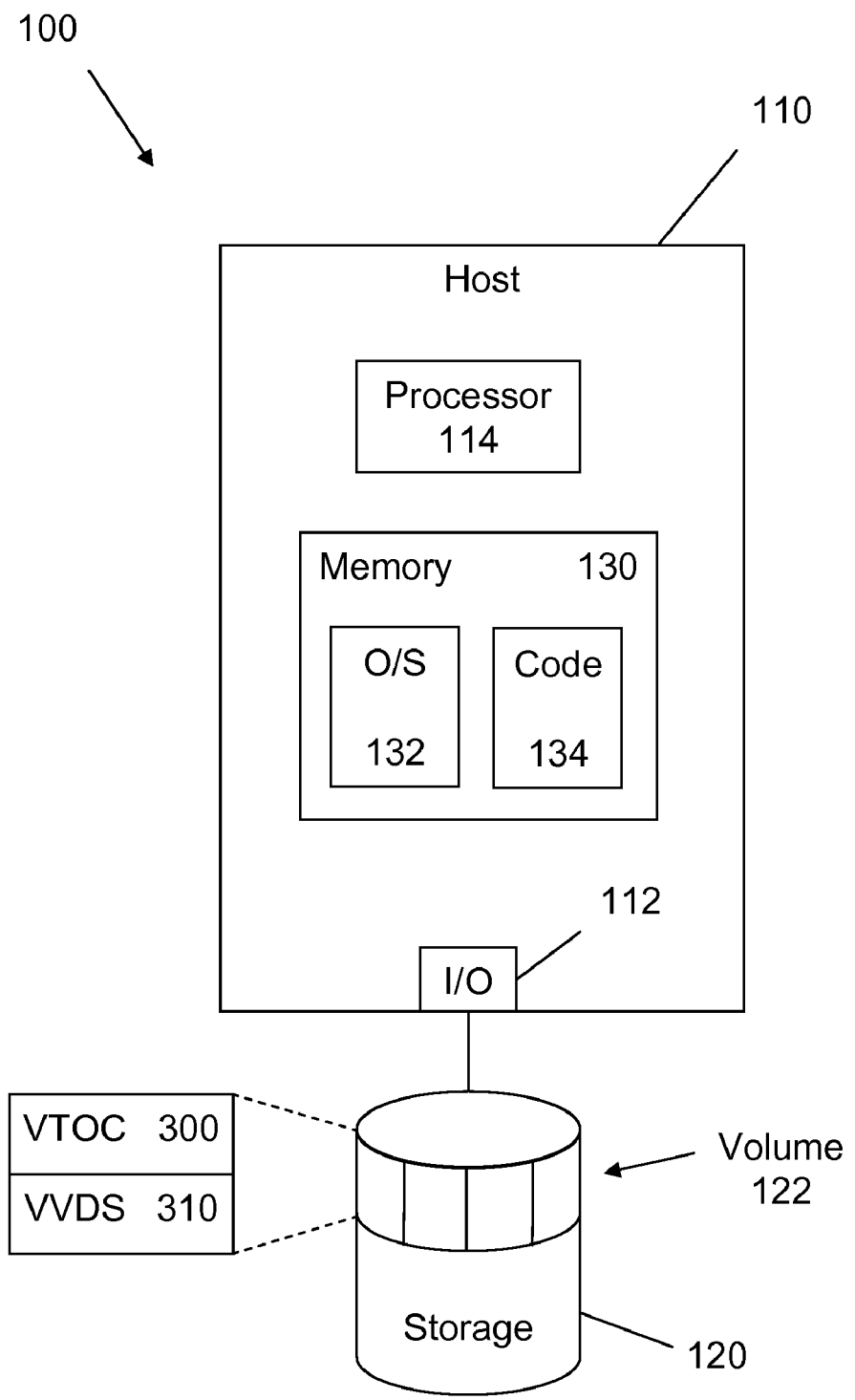
FIG. 1 is a block diagram of a storage system in which the present invention may be implemented.

FIG. 1 is a block diagram of a storage system 100 in which the present invention may be implemented. The system 100 includes a host 110 and at least one storage device 120, such as a hard disk drive or a tape drive. Although the storage device 120 in FIG. 1 is shown as being coupled directly to the host 110, a storage control unit, not shown, may be used between the two. The host 110 includes an interface 112 through which the storage device 120 is coupled, a processor 114 and a memory 130. For clarity, the memory 130 illustrated in FIG. 1 is merely representative of all storage and memory which is part of the host 110. It may be a single type of memory or storage or a combination of different types of memory and storage. Stored in the memory 130 is program code containing instructions to be executed by the processor 114 for carrying out the functions of the host 110. Such program code includes the host operating system (O/S) 132 as well as instructions 134 for performing the methods of the present invention. The memory 130 may also store various data structures involved with the creation and maintenance of the volume table of contents (VTOC) 300 and VSAM (virtual storage access method) volume data set (VVDS) 310 for volumes (such as representative volume 122) stored on the storage device 120.

Figure 2:
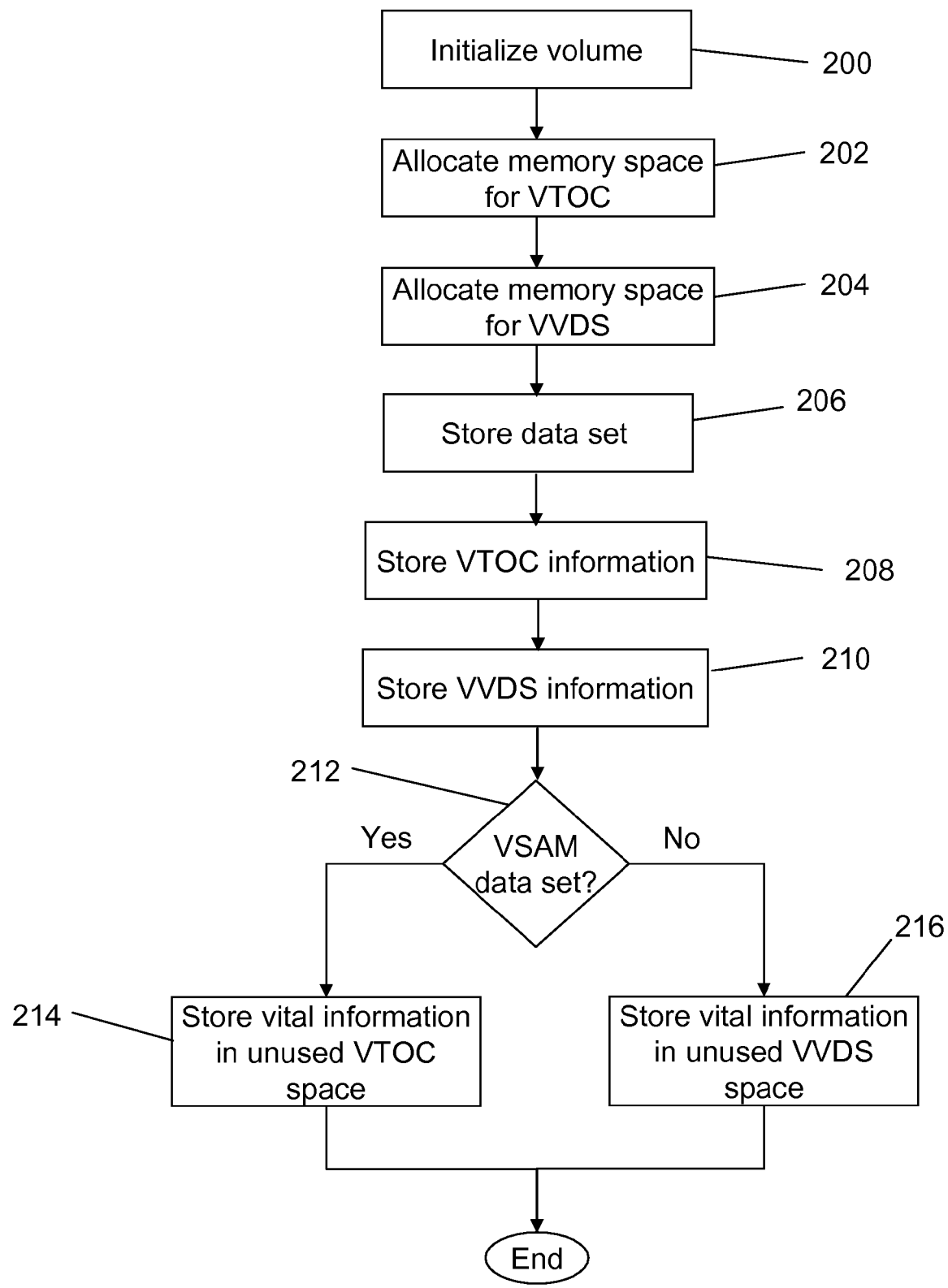
FIG. 2 is a flowchart of a method of the present invention.
Figure 3A:
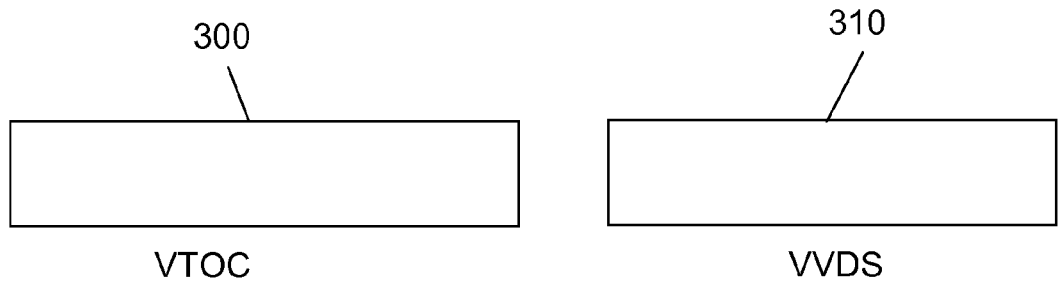
FIG. 3A is an illustration of an empty VTOC and an empty VVDS after space has been allocated to them.
Figure 3B:
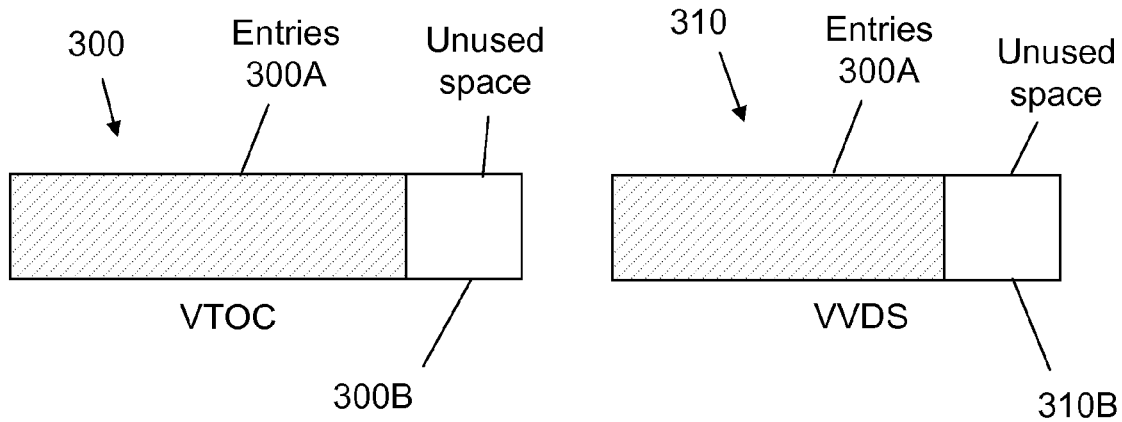
FIG. 3B is an illustration of a VTOC and a VVDS after data set entries have been stored, leaving unused space.

The flowchart of FIG. 2 illustrates steps of a method of the present invention. When a volume 122 is initialized (step 200), the host O/S 132 allocates a predetermined amount of the space for VTOC 300 entries (step 202) and for VVDS 310 entries (step 204), as illustrated in FIG. 3A. The amount of space allocated for each ensures that there will be unused space 300B, 310B, after data set entries 300A, 310A, are stored, as illustrated in FIG. 3B. Some of the unused space 300B, 310B may be used for future expansion of data set entries and some may be used by the present invention. A dataset in the volume 122 is sent from the host 110 to the storage device 120 to be stored on the recordable medium of the storage device 120 (step 206). Information about the data set is stored in the VTOC 300 (step 208) and in the VVDS 310 (step 210). Such information is used by the host O/S 132 to access the data set on the storage device 120.

Figure 3C:
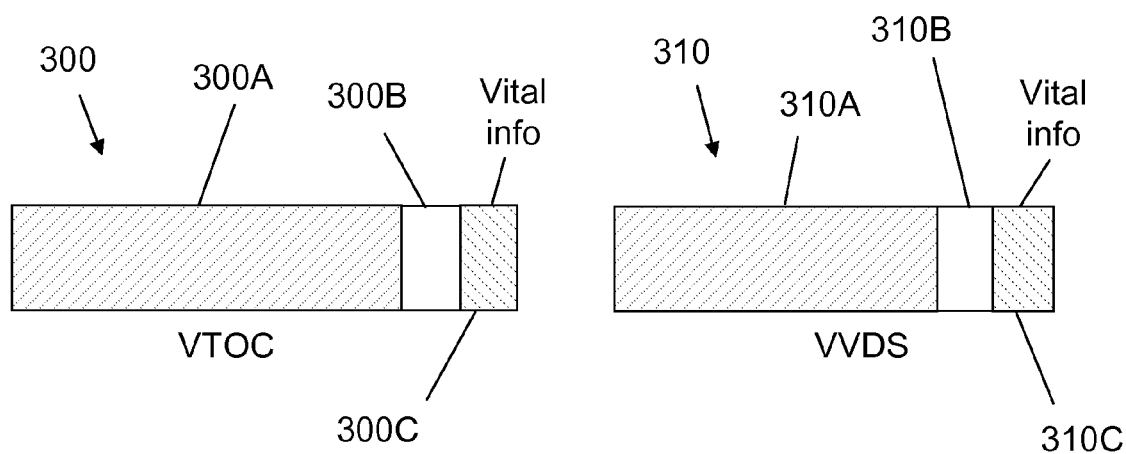
FIG. 3C is an illustration of a VTOC and a VVDS after critical data set information has been stored in the unused space.

In addition, vital information about the data set is also stored as an entry in unused space in the VTOC 300 or in the VVDS 310, depending on whether the volume 122 is a VSAM volume or a non-VSAM volume (step 212). Preferably, if the volume is a VSAM volume, the vital information will be stored as an entry 300C in unused space 300B of the VTOC 300 (step 214) and if the volume 122 is a non-VSAM volume, the vital information will be stored as an entry 310C in unused space 310B of the VVDS 310 (step 216), as illustrated in FIG. 3C.

For a VSAM dataset, the vital information may include the VSAM type, the extents occupied by the volume, an end-of-file mark, SMS attributes, extent ranges, high used relative byte address, high allocated relative byte address, usage statistics and definition attributes.

For a non-VSAM dataset, the vital information may include the SMS classes of the volume, SMS attributes, stripe count and compression token.

Preferably, the vital information entry is stored in the unused space 300B, 310B beginning at the end of the unused space of the data structure (the VTOC 300 or the VVDS 310) and filling towards the beginning of the unused space. In this way, space remains at the beginning of the unused space 300B, 310B (FIG. 3C) into which the conventional VTOC or VVDS entries may be expanded.

The host O/S 132 maintains a free space map of the VTOC 300 and VVDS 310 structures. When the vital information is stored in the unused space of either structure, the map is updated by toggling bits which represent the space being filled with the vital information to indicate that the just-filled space is no longer free.

If a data set entry in the VTOC 300 of a non-VSAM volume is damaged, corrupted or unreadable, it may be repaired by reading the appropriate vital information entry 310C stored in the VVDS 310. Similarly, if a data set entry in the VVDS 310 of a VSAM volume is damaged, corrupted or otherwise readable, it may be repaired by reading the appropriate vital information entry stored in the VTOC 300. Thus, data which might otherwise have been inaccessible to the host 110 may be accessed. Furthermore, if part of a data set stored on the storage device 120 has been damaged, it may be possible to use the vital information stored in the VTOC 300 and/or the VVDS 310 to access at least any portion of the data set which has not been damaged.

The present invention permits a data set to be recovered and accessed even when the associated entry in the VTOC 300 or VVDS 310 has been damaged and does so in a way that does not rely on conventional backup methods and does not require the use of additional space on the storage device 120.

It is important to note that while the present invention has been described in the context of a fully functioning data processing system, those of ordinary skill in the art will appreciate that the processes of the present invention are capable of being distributed in the form of a computer readable medium of instructions and a variety of forms. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for storing a data volume or a method for deploying computing infrastructure comprising integrating computer readable code into a computing system for storing a data volume.

What is claimed is:

1. A method for storing a data set of a volume, comprising: storing a data set of a volume on a recordable medium; storing first information about the data set as an entry in a first portion of a predetermined amount of space in a volume table of contents (VTOC) for the volume and storing second information about the data set as an entry in a first portion of a predetermined amount of space in a virtual storage access method (VSAM) volume data set (VVDS) for the volume, whereby a second portion of the predetermined amount of space in the VTOC and a second portion of the predetermined amount of space in the VVDS remain unused; storing specified information about the data set as an entry in the unused space in a selected one of the VTOC and VVDS, wherein storing the specified information about the data set in unused space comprises: storing third information about the data set as an entry in the unused space in the VTOC if the data set is in a VSAM volume; storing fourth information about the data set as an entry in the unused space in the VVDS if the data set is in a non-VSAM volume; if the entry of first information about the data set in the VTOC is damaged, repairing the VTOC entry from the entry of the third information stored in the VVDS; and if the entry of second information about the data set in the VVDS is damaged, repairing the VVDS entry from the entry of the fourth information stored in the VTOC.

2. The method of claim 1, wherein:
the third information comprises at least one of a VSAM type of the data set, extents occupied, an end-of-file mark, SMS attributes, extent ranges, high used relative byte address, high allocated relative byte address, usage statistics and definition attributes; and
the fourth information comprises SMS classes of the data set, SMS attributes, stripe count and compression token.

3. The method of claim 1, further comprising, if the data set is damaged, recovering at least a portion of the data set from the specified information stored in the selected one of the VTOC and VVDS.

4. A data storage system, comprising:
an interface through which one or more storage devices are coupled;
a processor operable to execute programming code; and
a memory in which the programming code is stored, the code comprising instructions for:
establishing a volume table of contents (VTOC) for data sets of a volume to be stored on the one or more storage devices, the VTOC having a first predetermined amount of space;
establishing a virtual storage access method (VSAM) volume data set (VVDS) for data sets for the volume, the WDS having a second predetermined amount of space;
directing that a data set be stored on the one or more storage devices;
directing that first information about the data set be stored as an entry in a first portion of the predetermined amount of space in the VTOC and that second information about the data set be stored as an entry in a first portion of the predetermined amount of space in the VVDS, whereby a second portion of the predetermined amount of space in the VTOC and
a second portion of the predetermined amount of space in the VVDS remain unused; and
storing specified information about the data set as an entry in the unused space in a selected one of the VTOC and VVDS, wherein the instructions for storing the specified information about the data set in unused space comprise:
storing third information about the data set as an entry in unused space in the VTOC if the data set is in a VSAM volume; and
storing fourth information about the data set as an entry in unused space in the VVDS if the data set is in a non-VSAM volume, wherein the code further comprises:
instructions for repairing the VTOC entry from the third information stored in the VVDS if the VTOC entry is damaged; and
instructions for repairing the VVDS entry from the fourth information stored in the VTOC if the WDS entry is damaged.

5. The system of claim 4, wherein the code further comprises recovering at least a portion of the data set from the specified information stored in the selected one of the VTOC and VVDS if the data set is damaged.

6. A computer program product of a computer readable medium usable with a programmable computer, the computer program product having computer-readable code embodied therein for storing a data set of a volume, the computer-readable code comprising instructions for:
storing a data set of a volume on a recordable medium;
storing first information about the data set as an entry in a first portion of a predetermined amount of space in a volume table of contents (VTOC) for the volume and storing second information about the volume as an entry in a first portion of a predetermined amount of space in a virtual storage access method
(VSAM) volume data set (WDS) for the volume, whereby a second portion of the predetermined amount of space in the VTOC and a second portion of the predetermined amount of space in the VVDS remain unused; and
storing specified information about the data set as an entry in the unused space in a selected one of the VTOC and VVDS, wherein the instructions for storing the specified information about the data set in unused space comprise instructions for:
storing third information about the data set as an entry in the unused space in the VTOC if the data set is in a VSAM volume; and
storing fourth information about the data set as an entry in the unused space in the WDS if the data set is in a non-VSAM volume, further comprising instructions for:
if the entry of first information about the data set in the VTOC is damaged, repairing the VTOC entry from the entry of the third information stored in the WDS; and if the entry of second information about the data set in the WDS is damaged, repairing the WDS entry from the entry of the fourth information stored in the VTOC.

7. The method of claim 6, wherein:
the third information comprises at least one of a VSAM type of the data set, extents occupied, an end-of-file mark, SMS attributes, extent ranges, high used relative byte address, high allocated relative byte address, usage statistics and definition attributes; and
the fourth information comprises SMS classes of the data set, SMS attributes, stripe count and compression token.

8. The method of claim 6, further comprising instructions for recovering at least a portion of the data set from the specified information stored in the selected one of the VTOC and VVDS if the data set is damaged.

9. A method for deploying computing infrastructure, comprising integrating computer readable code into a computing system, wherein the code, in combination with the computing system, is capable of performing the following:
storing a data set of a volume on a recordable medium;
storing first information about the data set as an entry in a first portion of a predetermined amount of space in a volume table of contents (VTOC) for the volume and storing second information about the data set as an entry in a first portion of a predetermined amount of space in a virtual storage access method (VSAM) volume data set (WDS) for the volume, whereby a second portion of the predetermined amount of space in the VTOC and a second portion of the predetermined amount of space in the VVDS remain unused; and
storing specified information about the data set as an entry in the unused space in a selected one of the VTOC and VVDS, wherein storing the specified information about the data set in unused space comprises:
storing third information about the data set as an entry in the unused space in the VTOC if the data set is in a VSAM volume; and
storing fourth information about the data set as an entry in the unused space in the WDS if the data set is in is a non-VSAM volume, further comprising:
if the entry of first information about the data set in the VTOC is damaged, repairing the VTOC entry from the entry of the third information stored in the WDS; and if the entry of second information about the data set in the VVDS entry is damaged, repairing the WDS entry from the entry of the fourth information stored in the VTOC.

10. The method of claim 9, wherein:
the third information comprises at least one of a VSAM type of the data set, extents occupied, an end-of-file mark, SMS attributes, extent ranges, high used relative byte address, high allocated relative byte address, usage statistics and definition attributes; and
the fourth information comprises SMS classes of the data set, SMS attributes, stripe count and compression token.

11. The method of claim 9, further comprising, if the data set is damaged, recovering at least a portion of the data set from the specified information stored in the selected one of the VTOC and VVDS.

* * * * *